J. C. WILSON.
SECTIONAL PNEUMATIC TIRE.
APPLICATION FILED SEPT. 22, 1913.
1,093,672.
Patented Apr. 21, 1914.
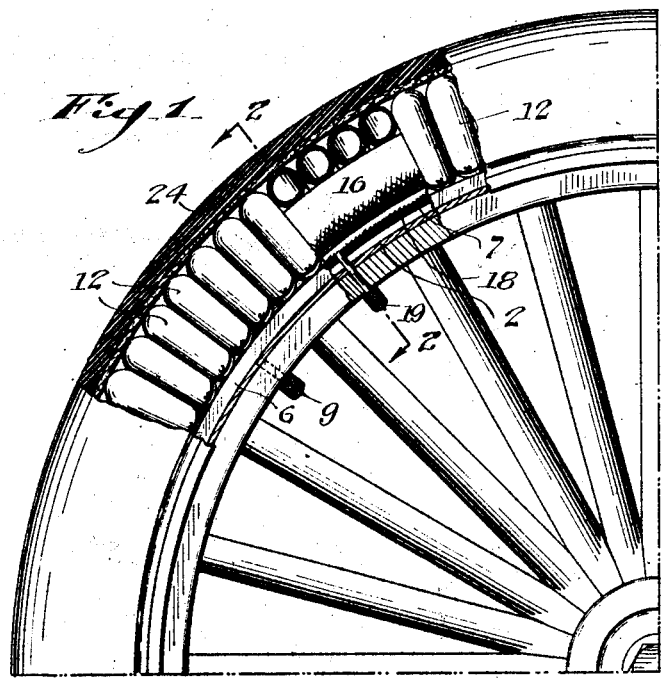
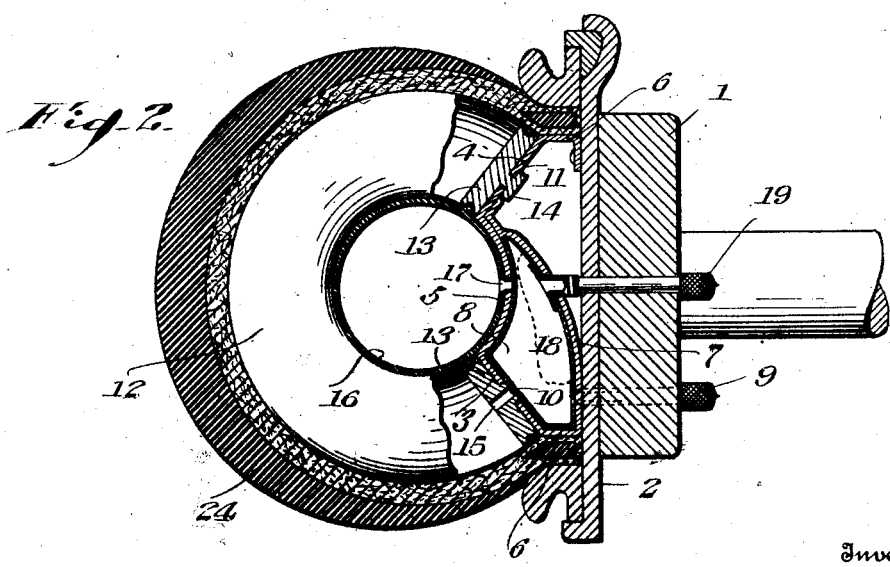
Witnesses
Theo. Rosemann
V. B. Hillyard.
Inventor
James C. Wilson,
By Victor J. Evans
Attorney

UNITED STATES PATENT OFFICE.

JAMES C. WILSON, OF BELCHERTOWN, MASSACHUSETTS.

SECTIONAL PNEUMATIC TIRE.

1,093,672.  Specification of Letters Patent.  Patented Apr. 21, 1914.

Application filed September 22, 1913. Serial No. 791,151.

*To all whom it may concern:*

Be it known that I, JAMES C. WILSON, a citizen of the United States, residing at Belchertown, in the county of Hampshire and State of Massachusetts, have invented new and useful Improvements in Sectional Pneumatic Tires, of which the following is a specification.

The invention has relation to vehicle tires embodying a plurality of inflatable sections, whereby in the event of one of such sections becoming deflated by reason of puncture or from other cause the remaining sections will adapt themselves automatically to fill the space of the deflated section and carry the load until proper repairs may be made.

The invention consists of a rim having a passage with which a plurality of inflatable sections are connected so as to be simultaneously inflated by air supplied to such passage from a suitable source or air compressor, said passage being provided with an expansible closing device for sealing the openings by means of which the passage of the rim has communication with the several pneumatic sections, said sealing device being preferably of the pneumatic variety and adapted to be expanded after the pneumatic sections of the tire have been properly inflated.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a detail view of one-fourth of a vehicle wheel provided with a pneumatic tire embodying the invention, a portion of such tire being broken away to show the relative arrangement of the parts. Fig. 2 is a section on the line 2—2 of Fig. 1 on a larger scale and having end portions of the pneumatic section broken away.

Corresponding and like parts are referred to in the following description, and indicated in all the views of the drawings, by the same reference characters.

The rim of the vehicle wheel may be of any construction and as illustrated in the accompanying drawings comprises parts 1 and 2, which constitute the main rim of the wheel. A supplemental rim is fitted upon the part 2 of the main rim and comprises oppositely inclined portions 3 and 4, an intermediate portion 5, which is depressed to form a seat, side flanges 6 and a part 7, which extends beneath the portions 3 and 5 and incloses a space 8, which constitutes a passage with which the several pneumatic sections are connected so as to receive a supply of air therefrom when inflated. An air valve 9 connects with a passage 8 and extends through the rim of the wheel and is adapted to have the usual tube connected therewith for supplying air to the passage 8 when it is required to inflate the pneumatic sections connected therewith. The several parts comprising the supplemental rim may be formed in any manner and preferably consist of portions of a single metal strip bent into the form substantially as shown. A plurality of openings 10 are formed in the inclined part 3 of the supplemental rim and other openings 11 are formed in the part 4. The supplemental rim may be secured to the main rim in any manner and receives the part comprising the tire.

As illustrated most clearly in Fig. 2 the pneumatic sections 12 are substantially of U form and have their end portions secured in any manner to the inclined portions 3 and 4 of the supplemental rim. The sections 12 may consist of short lengths of rubber tubing having their end portions closed by means of plugs 13, which are grooved in their edges and have parts of the tube 12 pressed into the grooved edges by a suitable binder. One of the plugs of each pneumatic section is formed with an oblong projection 14, which is adapted to be passed through one of the openings 11 and given a one-fourth turn to sit crosswise of such opening and thereby lock the plugs to the rim portion 4. The plug at the opposite end of the tube may be secured to the part 3 of the rim in any manner, such plug having an opening 15 to register with the opening 10, whereby air may enter the pneumatic section from the passage 8.

A pneumatic tube 16 encircles the supplemental rim and is fitted in the depressed portion 5 thereof. An opening 17 establishes communication between the tube 16 and the passage 8, thereby admitting of air entering the tube 16 when the passage 8 is supplied with air under pressure.

An expansible closure 18 is arranged within the passage 8 and is adapted to seal the openings 10 and 17 and confine the air in the several pneumatic sections after the latter have been inflated. This expansible closure 18 preferably consists of a pneumatic tube, which is provided with an air valve 19 to admit of the tube 18 being expanded so as to close the openings 10 and 17 after the pneumatic devices have been inflated, thereby confining the air in each. The tube 18 when collapsed does not fill the space 8 to such an extent as to interfere with the proper inflation of the pneumatic sections. This is indicated most clearly by the dotted lines in Fig. 2. After the pneumatic sections have been inflated and the tube 18 is likewise inflated such tube 18 expands and entirely fills the space 8, thereby closing the openings 10 and 17, as indicated most clearly by the full lines in Fig. 2.

The numeral 24 indicates the casing or shoe which may be of any form and is secured to the rim in any manner to admit of access being readily had to the pneumatic devices for any purpose whatsoever.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention what is claimed as new, is:—

1. In a pneumatic tube the combination of a rim having oppositely inclined side portions and an intermediate depressed portion, a pneumatic tube seated upon the intermediate depressed portion of the rim, a plurality of U shaped pneumatic sections extending over the pneumatic tube and having their end portions in engagement with the inclined side portions of the rim, the latter having a passage which is in communication with the pneumatic tube and sections, and an expansible closure located in the passage of the rim and adapted to seal the openings by means of which the pneumatic tube and sections are in communication with the passage of the rim.

2. In a pneumatic tire, the combination of a rim embodying oppositely inclined side portions and an intermediate continuous passage, a plurality of U-shaped tubes having a transverse arrangement with their ends seated against and secured to the oppositely inclined side portions of the rim, each of such tubes being in communication with the said passage and an expansible closure located in the passage of the rim for sealing the openings by means of which the several tubes have communication therewith.

3. In a pneumatic tire, the combination of a rim having oppositely inclined side portions and an intermediate continuous passage, the said side portions of the rim being provided with corresponding openings, the openings of one of the side portions communicating with the continuous passage, a plurality of U-shaped tubes arranged transversely of the rim and secured at one of their ends to the side portion of the rim having communication with the passage and having projections at their opposite ends to engage the openings in the other side portion of the rim and an expansible closure located in the passage of the rim for sealing the openings by means of which the U-shaped tubes have communication with the said passage.

In testimony whereof I affix my signature in presence of two witnesses.

JAMES C. WILSON.

Witnesses.
  H. H. WILSON,
  H. J. ALLEN.